United States Patent [19]

Maloney et al.

[11] Patent Number: 4,643,800

[45] Date of Patent: * Feb. 17, 1987

[54] METHODS OF DECONTAMINATING SECONDARY FIBER

[75] Inventors: James F. Maloney, Eagan; Richard E. Freis, Bloomington; Thomas R. Oakes, Stillwater, all of Minn.

[73] Assignee: Diamond Shamrock Chemicals Company, Dallas, Tex.

[*] Notice: The portion of the term of this patent subsequent to May 21, 2002 has been disclaimed.

[21] Appl. No.: 742,138

[22] Filed: Jun. 7, 1985

Related U.S. Application Data

[63] Continuation of Ser. No. 503,335, Jun. 20, 1983, abandoned, which is a continuation-in-part of Ser. No. 206,142, Nov. 12, 1980, abandoned, and a continuation-in-part of Ser. No. 458,432, Jan. 17, 1983, Pat. No. 4,518,459, which is a continuation of Ser. No. 93,744, Nov. 13, 1979, abandoned.

[51] Int. Cl.$^4$ ................................................. D21C 5/02
[52] U.S. Cl. ........................................ 162/5; 162/72; 162/76
[58] Field of Search .......................... 162/5, 55, 76, 72

[56] References Cited

U.S. PATENT DOCUMENTS

| | | | |
|---|---|---|---|
| 3,021,372 | 2/1962 | Dupre et al. | 252/174.21 |
| 3,574,050 | 4/1971 | Rice | 162/5 |
| 3,822,178 | 7/1974 | VanKoeppen et al. | 162/5 |
| 4,347,099 | 8/1982 | DeCuester et al. | 162/5 |
| 4,445,971 | 5/1984 | Lappi et al. | 162/158 |

FOREIGN PATENT DOCUMENTS

| | | | |
|---|---|---|---|
| 729071 | 3/1966 | Canada | 162/5 |
| 197607 | 7/1976 | Japan | 162/5 |

OTHER PUBLICATIONS

*The Condensed Chemical Dictionary*, Van Nostrand Reinhold Co., 1974, p. 858 (CCP).

*Primary Examiner*—S. Leon Bashore
*Assistant Examiner*—K. M. Hastings

[57] ABSTRACT

The method of substantially removing and dispersing resinous or waxy contaminants from contaminant-containing secondary fiber during repulping, is disclosed. The method includes combining the contaminant-containing secondary fiber in an aqueous repulping medium with a substituted oxyethylene glycol nonionic surfactant, and a water soluble, low molecular weight polyelectrolyte dispersant, at an elevated temperature.

16 Claims, No Drawings

METHODS OF DECONTAMINATING SECONDARY FIBER

This is a continuation of application Ser. No. 503,335, filed June 10, 1983, now abandoned, which is a continuation-in-part of U.S. patent application Ser. No. 206,142, filed Nov. 12, 1980, now abandoned, and a continuation-in-part of U.S. patent application Ser. No. 458,432, filed Jan. 17, 1983, now U.S. Pat. No. 4,518,459 which is in turn a continuation of U.S. patent application Ser. No. 93,744, filed Nov. 13, 1979, now abandoned.

BACKGROUND OF THE INVENTION

This invention relates to methods of decontaminating secondary (i.e., not virgin or primary) cellulosic fiber or fiber sources during repulping. More particularly, the present invention relates to methods of substantially removing contaminants such as waxes, adhesives, and the like from secondary fiber, dispersing them in the aqueous repulping medium, and removing the repulping medium from the pulp.

The present invention provides nearly complete removal of contaminants from the secondary fiber, and sufficiently permanent dispersion of them to prevent their deposition within the newly formed sheets or on production equipment. These contaminants, commonly referred to as "stickies", encompass a wide variety of substantially thermoplastic organic resinous water-insoluble contaminants such as waxes, hot melt adhesives, pressure sensitive adhesives, vinyl acetate-type coatings, SBR resins, latex adhesives, and others. Inks and the above substantially organic resinous water-insoluble contaminants form a broad category of deposits commonly referred to as "stickies and tackies".

These contaminants which can remain the secondary fiber after repulping or can later reagglomerate in the paper production waters can create a variety of series problems for the paper making industry, particularly in the liner board and corrugated industries. The contaminants typically form deposits on all types of paper making equipment, including the press roll and wet end of corrugating machines, press section calendars, dryer surfaces, wires, press felts, and the like. As a result, production time is lost and machine efficiency reduced due to sheet breaks at the breaker stacks, wrinkles at the rewinder, limited machine speeds due to wire filling, down time for deposit cleanup, and the like. Further these deposits typically require significant amounts of solvents and manpower for their removal, further contributing to their undesirability. Additionally, the stickies and tackies generally contaminate the paper sheets themselves, forming deposits which result in sheet defects such as holes, deposits, specks, and low brightness. In corrugated medium mills, frequently the product comprising secondary fibers will have poor absorbency because of the incorporated contaminants. This is a problem because absorbency is required for proper glue penetration of the corrugated products.

Many types of paper making utilize repulped secondary fibers. The paper products comprising such fibers include tissue, toweling, specialties grades, liner board, corrugated medium, boxboard and so on. Particularly the corrugated medium mills and liner board mills have turned to secondary fiber obtained from pre-used corrugated as a low cost fiber substitute. However, the ratio of secondary fiber to virgin fiber which can be utilized has been limited, due to the problems associated with stickies deposits in the system and sheets.

Until recently, the major form of control for stickies and tackies has been mechanical. Pressure screens, reverse cleaning systems and flotation loops have been used to remove these contaminants from secondary fiber stock flows in processes such as tissue, toweling, corrugating board, and secondary liner board manufacture. Chemical approaches to the problem have incorporated talc, polymers, dispersants, and so on, but with little success. In the manufacture of corrugating and liner board, steam and asphalt dispersion units are sometimes used in an attempt to control these deposits. However, these machines are typically expensive to purchase and even more expensive to operate on a continual basis. Further, even where contaminants may appear to have been dispersed by known methods of controlling contaminants, these methods do not appear to prevent the contaminants from re-agglomerating, for example when the repulped paper fibers are being used to form a paper product. When the contaminants reagglomerate, the above-described problems of deposition will typically occur. Frequently the paper-making process is a continuous process from the repulping of secondary fiber until the new product is dried. Typically the production waters are redistributed or re-used through the system. Consequently, dispersed contaminants which are not sufficiently dispersed or which do not remain dispersed ultimately can cause problems as the process waters are recirculated through the system.

Accordingly, use of repulped secondary fiber originally containing contaminants such as wax and adhesives continues to be a significant source of lost production and expense due to the tendency of these contaminants to form deposits within the paper making system and on the sheets.

The present invention provides substantially reduced (if not eliminated) deposition of objectionable contaminants on processing machinery and in the sheets themselves where secondary fiber is utilized in a paper making process. Secondary fiber processed according to this invention will generally allow for increased production, less down time for deposit removal, faster machine speeds due to elimination of web breaks caused by sticky felt and rolls, improved drainage, faster drying, and the like.

SUMMARY OF THE INVENTION

The present invention provides a method in which a combination of particular nonionic surfactants and dispersants provide both foam control (e.g., defoaming effects), high deinking efficiency where required, enhanced handsheet brightness and unexpected increased contaminant removal from fiber and dispersion resulting in restriction of contaminant deposition.

The present invention is a method of substantially removing and dispersing contaminants from contaminant-containing secondary fiber during repulping. The method involves use of an aqueous repulping medium comprising contaminant-containing secondary fiber, a sufficient amount of a substituted oxyethylene glycol nonionic surfactant and a contaminant-dispersing amount of a water soluble, low molecular weight polyelectrolyte dispersant at a temperature above the melting point of a contaminant to be removed from the secondary fiber. This method achieves unexpected control of stickies and tackies as well as foam control, enhanced handsheet brightness, and high deinking efficiency where any of these latter properties may also be desirable.

For purposes of the present invention, the following terms shall be defined:

"Washing-type" or "washing" methods shall mean methods for producing substantially dispersed secondary fiber contaminants, comprising suspending the contaminated secondary fiber in an aqueous medium, allowing the contaminants to disperse into the aqueous medium, and substantially separating the decontaminated fiber from the contaminant-containing aqueous medium by means of washing-type steps.

"Substituted oxyethylene glycol surfactants" herein shall mean nonionic surfactants comprising oxyethylene glycol chain wherein one terminal hydroxyl of the chain has been replaced with an aliphatic or alkylaromatic ether group, and the other terminal hydroxyl has been replaced with a polyoxypropylene group or a benzyl ether group.

"Low molecular weight" herein shall mean having a molecular weight in the range of 500 to 50,000.

"Water soluble" as the term is intended herein means any material that substantially dissolves in water at room temperature to form a solution.

DETAILED DESCRIPTION OF THE INVENTION

In the usual practice of the process of this invention, contaminated secondary fiber is blended with water, a substituted oxyethylene glycol surfactant and a dispersant, thereby causing contaminants to separate from the fiber and become distributed or dispersed in a very stable condition throughout the aqueous fiber slurry or medium. To achieve this the components are preferably heated, or if already at the required temperature due for example to the heat of the system, maintained, at a temperature above the melting point of the contaminant to be removed or dispersed. Generally the required temperature will be in the range of about 25° C. to 85° C., or, due to the nature of the frequently-encountered contaminants, more typically in the range of about 35° C. to 60° C.

The decontaminated fiber is then substantially separated or isolated from the contaminated aqueous medium, e.g., by centrifuging, decanting, filtering, or preferably, screening. Screening involves the deposition of the fiber pulp onto a foraminous surface capable of retaining the fiber while the aqueous medium drains through the holes in this surface. If desired, the separation or recovery of the decontaminated fiber from the aqueous medium can be preceded by a concentration or dilution step and can be followed by washing-type steps, e.g., dilution and/or screening, which steps can be accompanied by agitation of dilute fiber slurries.

It is particularly preferred in this invention that the contaminant control begin with the repulping of the secondary fiber, i.e., that the surfactant and dispersant used in this invention be present during the repulping process. However, the present surfactants and/or dispersants can also be added downstream from the repulping including sidehill washer stages and/or to the caustic extraction stage of a bleaching system. It can be advisable to select an addition point ahead of a system exit, or ahead of a problem location such as a dilution step or a point where pH or temperature changes occur which would lead to the deposition of contaminants.

Where decontaminated secondary fiber is utilized, contaminant build-up on paper processing machinery has been experienced particularly where the decontaminated fiber was obtained from papers having increased water resistance, for example, wax coated papers such as cold cups, or corrugated board products such as cartons or boxes. In this type of contaminant environments, contaminant deposition was found to occur even when the advantageous substituted oxyethylene glycol surfactants of U.S. Ser. No. 093,744, filed Nov. 13, 1979, discussed hereinafter, were utilized.

In a practice of the present invention, the addition of a water soluble, low molecular weight polyelectrolyte dispersant and a substituted oxyethylene glycol to the repulping milieu produced a completely unexpected and unpredicted improved dispersion of the contaminants into the processing medium.

This improved dispersion of the contaminants into the aqueous repulping medium resulted in substantially reduced deposition of the objectionable materials on processing machinery as the paper making process continued after repulping, thus reducing machinery down time. Where the secondary fiber processed according to this invention is later used in the manufacture of paper products, generally the result will be significantly reduced deposition of stickies and tackies on machinery and on the sheets themselves, thus increasing machine efficiency.

Further, the polyelectrolyte dispersants herein tend to prevent (by preferential complexation) the formation of certain insoluble reaction products formed between ions of metals such as calcium and magnesium and the organic materials commonly present in secondary fiber such as fatty acids (a major constituent of printing inks), resin, casein and starch. Such insoluble, hard water reaction products are analogous to the familiar bath tub or hard water deposit.

The present invention involves use of a nonionic surface active agent or surfactant. The surfactant comprises an oxyethylene glycol chain, wherein one terminal hydroxyl of the chain has been replaced with an ether group selected from the group consisting of an aliphatic ether group and an alkylaromatic ether group, and the other terminal hydroxyl of the chain has been replaced with an ether group selected from the group consisting of a polyoxypropylene group and a benzyl ether group. A typical formula for preferred surfactants of this invention would be as follows:

wherein
a is zero or 1,
Ar represents an aromatic residue, preferably monocyclic,
R represents an aliphatic group,
n has a value from about 3 to about 50,
m has a value from about zero to about 50, and
Y is selected from the group consisting of hydroxy and benzyl ether and is benzyl ether when m equals 0.

The R group is typically saturated and contains at least 6 carbons. When a equals zero, R contains from 6 to 24 carbons; when a equals 1, R normally contains no more than 18 carbon atoms. In short, the $R(Ar)_a$ group contains at least 6 aliphatic carbon atoms and up to a total of 24 carbon atoms.

A preferred foam-suppressing surface active agent for use in the present method is of the formula:

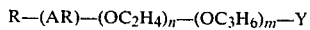

wherein R is a monovalent higher aliphatic group containing from 6-24 carbon atoms, AR represents an aromatic residue, n is about 6-15, m is about 12-48; n:m is less than 1, and Y is hydroxyl or benzyl ether.

The foregoing structural formula can be considered to encompass two major classes of surfactants, i.e. (a) alkylene oxide adducts of alkylphenols, and (b) alkylene oxide adducts of higher (greater than $C_5$ aliphatic alcohols. These surfactants are described in detail in commonly assigned U.S. patent application Ser. No. 093,744 filed Nov. 13, 1979 on behalf of of Richard E. Freis, James E. Maloney and Thomas R. Oakes, entitled "Methods of Deinking Secondary Fibers", the entire disclosure of which is incorporated by reference herein. A continuation of U.S. Ser. No. 093,744 (now abandoned) was filed on Jan. 17, 1983, and has been assigned U.S. Ser. No. 458,432 now U.S. Pat. No. 4,518,459.

The invention of U.S. Ser. No. 093,744 relates to washing methods of deinking and decontaminating secondary fiber and to the use of substituted oxyethylene glycol nonionic surfactants in such washing-type deinking and decontamination methods. Washing methods of deinking are distinguished from flotation methods which are more technically involved and which generally require more capital investment. The substituted oxyethylene glycol nonionic surfactants described and claimed in U.S. Ser. No. 093,744 provide enhanced deinking and decontaminating performance (vis-a-vis, conventional washing methods) with unexpected low foaming throughout wide variation in processing temperature.

The method of the present application, as well as U.S. Ser. No. 093,744, also contemplates the avoidance or mitigation of the drawbacks of conventional washing-type repulping methods while obtaining the advantages of those methods, particularly as compared to the more complicated, more capital-intensive, and more sensitive flotation methods. This invention is based upon the discovery of a particular class of dispersants which unexpectedly enhance the performance of the substituted oxyethylene glycol surfactants of U.S. Ser. No. 093,744, primarily in decontamination.

In the context of this invention, the present dispersants provide nearly complete removal and sufficiently permanent dispersion of secondary fiber resinous contaminants to prevent their deposition within the sheets or on production.

The present invention also involves the use of polyelectrolyte dispersants. A "polyelectrolyte dispersant" as the term is intended herein means any homo, co, ter, etc., polymer of the structure:

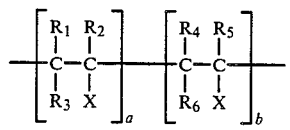

wherein $R_1$, $R_2$, $R_4$ and $R_5$ are independent and can be hydrogen, $C_1$-$C_4$ lower alkyl, alkylcarboxy (e.g., $-CH_2COOH$) or mixtures thereof; $R_3$ and $R_6$ can be hydrogen, carboxy, alkylcarboxy, or mixtures thereof, and X can be carboxy (including salts or derivatives thereof, e.g., amide), acetyl, or hydrocarbon moieties commonly attached to free radical polymerizable monomers (e.g., $-C_6H_5$ in styrene); a+b having a value in the range of 15 to about 1,000.

Examples of materials within the scope of the above formula include polymaleic acid, polyacrylic acid, polymethacrylic acid, polyacrylic acid/itaconic acid copolymers, polyacrylic acid/hydrolyzed maleic acid copolymers, polymaleic acid/itaconic acid copolymers, hydrolyzed polymaleic acid/vinyl acetate copolymers, polyacrylic acid/acrylamide copolymers, polyacrylic acid/methacrylic acid copolymers, styrene/maleic acid copolymers, sulfonated styrene/maleic acid copolymers, polymaleic acid/methacrylic acid copolymers, maleic acid telomers, maleic/alkyl sulfonic copolymers.

A particularly prefered class of water soluble polyelectrolytes for use in the practices of the present invention is the polyacrylate compounds. The polyacrylate compounds comprise polymers and copolymers of the structure:

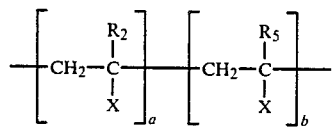

and their derivatives, wherein $R_2$, $R_5$, X, a and b are defined as above.

In a most preferred practice of the present invention, X is $-COOZ$, wherein Z is H, or a monovalent cation, e.g. $Na^+$, $K^+$, or $HN_4^+$. Thus, typical most preferred polyelectrolytes of the present invention are polyacrylic acid (e.g. GOODRITE K732 available from B. F. Goodrich Company), polymethacrylic acid (e.g., TAMOL 850, available from Rohm & Haas), and copolymers of acrylic acid/methacrylic acid (e.g., AQUATREAT available from ALCO Chemical).

The polyelectrolytes of this invention must be water soluble. Generally speaking, to be water soluble, the polymer must contain sufficient polar groups (e.g., COOH) for the molecule to interact with the polar water molecules. This means that in copolymers, terpolymers, tetramers, etc., with unsaturated monomers which are predominantly or entirely hydrocarbon (e.g., styrene) there must be sufficient polar functional groups for the polymer to dissolve in room temperature or below water. Generally, at least about 10 mole percent of the monomers comprising the polymer must contain polar functionality (e.g.,

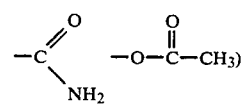

to provide the required water solubility.

The low molecular weight polyelectrolytes of present invention generally have molecular weights of less than about 50,000 with preferred molecular weights in the range of about 500 to 25,000, most preferably of 750 to 5,000. Thus, the sum of a+b above, generally falls in range of 5 to 1,000, preferably 10 to 500 and most preferably 12 to 450. One skilled in the art will recognize that the materials within the above molecular weight ranges are generally of lower molecular weight than polymers generally referred to in the art as flocculants which may have molecular weights in the range of several million or more. Flocculants perform function of agglomerating suspended particles opposite the desired function of dispersion described herein. Thus, these high molecular weight materials operate in a manner effectively opposite that of the materials described herein. The lower molecular weight materials of the present invention are generally referred to in the art as "dispersants".

Functionally speaking, the polyelectrolytes of this invention should be present in the aqueous surfactant mixture to the extent necessary to prevent deposition of contaminants (e.g., pigments, coatings, fillers, adhesives, etc.) onto processing equipment. Generally, the concentrations of the present polyelectrolytes falls in the range of about 5 to about 500 parts per million, with concentrations in the range of about 10 to about 75 ppm being preferred.

Another area where the present invention is found to be particularly effective is in the area of decontaminating secondary fiber having photocopying inks therein, (i.e., recycled photocopies). Photocopies are made on coated or uncoated papers, the coated papers having various materials thereon (and therein) to enhance the ability of the paper to accept and permanently retain Xerographic imaging powders. Photocopy paper coatings and sizes and the imaging powder itself tend to be suspended during the repulping step (i.e., to be held in the solution primarily by physical agitation of the liquid) only to be deposited on processing machinery as a result of eventual coagulation or as the aqueous processing stream cools and/or is less aggressively agitated. Use of the polyelectrolytes described herein (in conjunction with the substituted oxyethylene glycols) tends to reduce or substantially eliminate such deposition.

Yet another area where the present invention finds utility is the deinking and decontamination of newsprint. Recycled newsprint is distinguishable from other secondary fiber sources because the printing ink used in printed directly or uncoated fiber. In other secondary fiber sources the print is on a coated fiber (i.e., not directly on the fiber itself). The difficulty with deinking of newsprint is increased by the fact that newsprint can be up to 12% to 14% by weight printing ink which is essentially all relatively hard-to-disperse carbon black. Given the quantity and availability of recycled newsprint, efficient newsprint deinking and decontamination methods are a desideratum of the secondary fiber industry of the highest order.

The improvement of the present invention optionally contemplates the use of various well-known water soluble solvents or cosolvents, along with the dispersants and surfactants. Particularly preferred examples of such solvents include tetrahydrofuran, tetrahydrofurfural alcohol, and ethoxylated and propylated derivatives thereof.

The following non-limiting examples are intended to illustrate the practice of the present invention and should not be used to limit its scope.

EXAMPLE I

The deinking and decontamination of wax coated paper consumer "cold cups" or drink cups to produce handsheets was accomplished on a laboratory scale using the standard deinking formula of Table IA. Repulping of cold cups was accomplished in a pulper (under moderate agitation) at 160° F. (71° C.) for 60 minutes.

TABLE IA

| Material | Amount |
| --- | --- |
| Water | 250 ml |
| Fiber stock (to be deinked and decontaminated) | 18.8 g |
| Chlorine dioxide (10%) | 1.9 ml |
| NaOH (50% aqueous solution) | 0.4 ml |
| Substituted oxyethylene glycol (10%)* | 1.9 ml |
| Solvent | 0.4 ml |

*$C_{10-14}$ alcohol-(ethylene oxide)$_{20}$—$CH_2$—$C_6H_5$

Various solvents were employed as listed in Table IB.

TABLE IB

Solvents 1. 50 weight percent kerosene and 50 weight percent aromatic naphtha with a nonylphenol-(EO—6—OH emulsifier.
2. butyl "CARBITOL" (diethylene glycol monobutylether).
3. "PENTOXONE" (4-methoxy-4 methyl-pentanone available from Shell Chemical Co.).
4. tetrahydrofuran (available from Quaker Oates Chemical Company).
5. mono ethoxylated tetrahydrofurfuryl alcohol (also available from Quaker Oates Company).

Handsheets prepared from the deinked and decontaminated cold cups were found to have improved brightness but were found to generate a heavy colored wax buildup on the equipment (i.e., on the inside of the glass beakers). It was then decided that solvent number 1 (vis., the mixture of kerosene and aromatic naphtha) would be employed and various dispersants would be added to the deinking composition at the level of 12 parts per million. The dispersants employed are listed in Table IC. Dispersants in Table IC numbered 1a, 2a and 3a are within the scope of the present invention.

TABLE IC

Dispersants

1a. Aqueous solution of 15 weight percent "DEQUEST 2054" (see 5 below), 12 weight percent of 50/50 mole percent copolymer of hydrolyzed maleic anhydride and vinyl acetate having a molecular weight of about 3,000.
2a. 50/50 mole percent copolymer of hydrolyzed maleic anhydride and vinyl acetate having a molecular weight of about 3,000 (50% active).
3a. Polyacrylic acid having a molecular weight of about 3,000 (e.g., GOODRITE K732, commercially available from B. F. Goodrich Co.) (50% active).
4a. Ethylene diamine tetraacetic acid, sodium salt aqueous solution, 40% active (e.g. VERSENE 100 available from Dow Chemical Co.).
5a. Hexamethylenediamine tetramethylenephosphonate, hexapotassium salt aqueous solution, 36% active (e.g., "DEQUEST" 2054 available from Monsanto Company).

Handsheets were prepared utlizing the above compositions, their Hunter brightness being determined. The results of this evaluation appear in Table ID. Table ID indicates that the best combination of solvent and dispersant within the scope of this invention (i.e., the combination which provides the best reduction of wax deposit and brightnes enhancement) is the tetrahydrofurfuryl alcohol solvent (straight and 9EO) used in conjunction with polyacrylic acid dispersant having molecular weight of about 3,000.

TABLE ID

| Solvent | Dispersant | Wax Deposit | BRIGHTNESS (HUNTER) Y | X | Z | WHITENESS | WHITENESS OR DELTA WHITENESS |
|---|---|---|---|---|---|---|---|
| 1 | None | Heavy | 81.9 | 81.1 | 84.0 | 66.4 | 25.0 |
| 5 | None | Heavy | 84.7 | 83.5 | 89.7 | 72.0 | 19.4 |
| 2 | None | Heavy | 84.0 | 83.4 | 88.4 | 70.7 | 20.8 |
| 3 | None | Heavy | 83.5 | 83.0 | 87.5 | 69.8 | 21.7 |
| 4 | None | Heavy | 85.0 | 83.6 | 89.9 | 71.9 | 19.6 |
| 1 | 1a | None | 83.3 | 83.0 | 88.2 | 71.6 | 19.5 |
| 1 | 5a | Heavy | 84.7 | 83.7 | 90.4 | 73.3 | 18.1 |
| 1 | 2a | None | 83.4 | 81.4 | 87.9 | 70.8 | 20.7 |
| 1 | 4a | Some | 87.3 | 85.2 | 93.8 | 75.9 | 15.6 |
| 1 | 3a | None | 85.1 | 84.2 | 91.7 | 75.2 | 16.2 |
| THFA 9EO* | 3a | None | 87.7 | 85.7 | 95.6 | 78.4 | 13.1 |
| THFA** | 3a | None | 86.6 | 84.6 | 93.8 | 77.0 | 14.5 |

*Tetrahydrofurfural alcohol with 9 moles of ethylene oxide (EO) condensed thereon.
**Tetrahydrofurfural alcohol.

EXAMPLE II

Secondary fiber having Xerographic ink and/or electrostatic coatings thereon were deinked and decontaminated and handsheets prepared therefrom, the brightness values of the resulting handsheets being shown in Table II. The family of substituted oxyethylene glycols indicated in Table II are the nonyl phenol-polyethylene (EO) oxide nonionic surfactants, there being an average of 9.5 moles of ethylene oxide per mole of nonylphenol. Additionally, various amounts of propylene oxide (PO) were condensed on the ethylene oxide chain to provide substituted oxyethylene glycol nonionic surfactants with different deinking properties. The remainder of the composition used to obtain the brightness values for the handsheets indicated in Table II was 250 milliliters water, 15 grams Xerographic coated paper stock, 0.09 grams 50% NaOH. The substituted oxyethylene glycol was added to the extent of 0.04 ml and the co-solvent (where added) was added to the extent of 0.4 ml (two handsheets were prepared for each example, the brightness values indicated being an average for the two sheets).

Table II indicates that the nonylphenol ethoxylates are good deinkers of Xerographic grade secondary fiber. Those nonylphenol ethoxylates with more propylene oxide were found to be slightly better in their performance than those with less. Further, polyacrylic acid dispersant having a molecular weight of about 3,000 was found to provide enhanced deinking and decontamination performance, vis-a-vis, the same composition without such a dispersant. Lastly, in contrast with the paper grades having wax coatings thereon, deinking of Xerographic grade papers were enhanced only slightly by the addition of a co-solvent.

TABLE II

| Substituted Oxyethylene Glycol | Dispersant | Co-Solvent | HUNTER REFLECTOMETER BRIGHTNESS VALUES | | |
|---|---|---|---|---|---|
| | | | X | Y | Z |
| nonylphenol (EO)$_{9.5}$—OH | None | None | 77.8 | 78.4 | 91.9 |
| nonylphenol | None | None | 78.8 | 80.1 | 92.6 |
| (EO)$_{9.5}$—(PO)$_6$—OH nonylphenol | None | None | 79.4 | 80.4 | 94.6 |
| (EO)$_{9.5}$—(PO)$_{12}$—OH nonylphenol | None | None | 80.0 | 80.6 | 95.0 |
| (EO)$_{9.5}$—(PO)$_{24}$—OH nonylphenol | 2a | None | 80.7 | 81.4 | 97.3 |
| (EO)$_{9.5}$—(PO)$_{24}$—OH nonylphenol | 3a | None | 82.4 | 83.1 | 99.6 |
| (EO)$_{9.5}$—(PO)$_{24}$—OH nonylphenol | 3a | butyl carbitol | 82.6 | 83.3 | 99.4 |
| (EO)$_{9.5}$—(PO)$_{24}$—OH nonylphenol | 3a | tetrahydrofurfuryl alcohol | 81.8 | 82.5 | 99.7 |
| (EO)$_{9.5}$—(PO)$_{24}$—OH | | | | | |

EXAMPLE III

Newsprint was deinked and decontaminated using various combinations of deinking surfactant, dispersant and cosolvent. The newsprint was repulped as described in Example I. The standard deinking/decontaminating/repulping medium employed was as follows:

| | |
|---|---|
| Water | 500 ml |
| Sodium metasilicate | 0.5 g |
| Newsprint | 25.0 gm |
| Substituted oxyethylene glycol | 0.4 gm |
| Dispersant | 25 ppm |
| Cosolvent (when added) | 0.3 gm |

The brightness (Hunter Reflectometer values) of handsheets prepared from the deinked newsprint are shown in Table III.

TABLE III

| Substituted Oxyethylene Glycol | Dispersant | Cosolvent | Brightness (Hunter Z Value) |
|---|---|---|---|
| nonylphenol (EO)$_{9.5}$—OH | None | None | 58.8 |
| nonylphenol (EO)$_{9.5}$—(PO)$_6$—OH | None | None | 54.6 |
| nonylphenol (EO)$_{9.5}$—(PO)$_{24}$—OH | None | None | 51.7 |
| nonylphenol (EO)$_{9.5}$—(PO)$_6$—OH | 2a | None | 55.5 |
| nonylphenol (EO)$_{9.5}$—(PO)$_6$—OH | 3a | None | 52.7 |
| nonylphenol (EO)$_{9.5}$—(PO)$_6$—OH | 3a | butyl carbitol | 56.1 |
| nonylphenol (EO)$_{9.5}$—(PO)$_6$—OH | 3a | THFA | 54.2 |
| nonylphenol (EO)$_{9.5}$—(PO)$_6$—OH | 3a | THFA—EO—OH | 53.8 |
| nonylphenol (EO)$_{9.5}$—(PO)$_6$—OH | | | |

I claim:

1. A method of substantially removing and dispersing a contaminant from contaminant-containing secondary fiber during repulping and of preventing the deposition of said dispersed contaminants on paper processing equipment, which comprises:
   (a) forming an aqueous repulping medium of contaminant-containing secondary fiber, an effective defoaming amount of a substituted oxyethylene glycol nonionic surfactant of the formula:

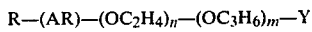

wherein R is a saturated aliphatic group of 6-24 carbon atoms, AR is a aromatic residue, n is about 6-15, m is about 12-48, n:m is less than one, and Y is selected from the group consisting of OH and benzyl ether; and an amount of a water soluble low molecular weight polyelectrolyte dispersant having a molecular weight of about 500-5000 effective to disperse the contaminants to prevent substantial deposition of the contaminants on the processing equipment, the medium having a temperature above the melting point of a contaminant to be removed from the secondary fiber, the contaminant comprising a thermo-plastic organic resinous water-insoluble wax, adhesive, or resin;
   (b) allowing dispersion of the contaminant from the secondary fiber into the aqueous repulping medium to obtain a substantially decontaminated fiber in a contaminant-containing repulping medium; and
   (c) separating the substantially decontaminated fiber from the contaminant-containing aqueous repulping medium.

2. The method of claim 1 wherein the aqueous repulping medium has a temperature in the range of about 25° C. to 85° C.

3. The method of claim 1 wherein the aqueous repulping medium has a temperature in the range of about 35° C. to 60° C.

4. The method of claim 1 wherein the substantially decontaminated fiber is separated by screening.

5. The method of claim 1 wherein the aqueous repulping medium further comprises tetrahydrofurfural alcohol, ethoxylated derivatives or mixtures thereof.

6. The method of claim 1 further comprising washing the substantially decontaminated fiber.

7. The method of claim 6 wherein washing comprises dilution of the fiber to obtain a fiber slurry, and separation of the fiber from the slurry.

8. The method of claim 1 wherein the polyelectrolyte dispersant comprises a copolymer of maleic acid and vinyl acetate.

9. The method of claim 1 wherein the polyelectrolyte dispersant comprises a polyacrylate compound.

10. The method of claim 1 wherein the polyelectrolyte dispersant is of the structure:

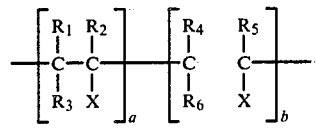

wherein $R_1$, $R_2$, $R_4$ and $R_5$ are independent and are selected from the group consisting of hydrogen, $C_1$-$C_4$ lower alkyl, alkylcarboxy or mixtures thereof, $R_3$ and $R_6$ are independent and selected from the group consisting of hydrogen, carboxy, alkylcarboxy, or mixtures thereof, X is selected from the group consisting of carboxy, salts or derivatives of carboxy, acetyl, hydrocarbon moieties commonly attached to free radical monomers, COOZ where Z is H, a monovalent metal ion or ammonium, or mixtures thereof; and the total of a+b falls in the range of 15 to 1,000.

11. The method of claim 10 wherein $R_1$, $R_3$, $R_4$ and $R_6$ are hydrogen, $R_2$ and $R_5$ are hydrogen or methyl, and x is carboxy.

12. The method of claim 1 wherein the contaminant comprises a wax.

13. The method of claim 1 wherein the contaminant comprises an adhesive.

14. The method of claim 1 wherein the secondary fiber comprises corrugated board.

15. The method of claim 14 wherein the contaminant comprises a wax.

16. The method of claim 15 wherein the contaminant comprises a hot-melt adhesive.

* * * * *